US006480758B2

(12) United States Patent
Stevens

(10) Patent No.: US 6,480,758 B2
(45) Date of Patent: Nov. 12, 2002

(54) PACKAGE DELIVERY SYSTEM

(75) Inventor: John K Stevens, Toronto (CA)

(73) Assignee: eBox Inc., Toronto (CA)

( * ) Notice: Subject to any disclaimer, the term of this patent is extended or adjusted under 35 U.S.C. 154(b) by 0 days.

(21) Appl. No.: 09/681,654

(22) Filed: May 16, 2001

(65) Prior Publication Data

US 2001/0045450 A1 Nov. 29, 2001

Related U.S. Application Data

(63) Continuation of application No. PCT/US00/28415, filed on Oct. 14, 2000.
(60) Provisional application No. 60/206,939, filed on May 25, 2000.

(51) Int. Cl.[7] .......................... G06F 7/00; G06F 17/00
(52) U.S. Cl. ...................... 700/244; 700/237; 700/241; 340/825.31
(58) Field of Search .............................. 700/237, 241, 700/244; 340/825.31; 342/457

(56) References Cited

U.S. PATENT DOCUMENTS

| | | | | |
|---|---|---|---|---|
| 4,727,368 A | | 2/1988 | Larson et al. | |
| 5,444,444 A | | 8/1995 | Ross | |
| 5,625,668 A | | 4/1997 | Loomis et al. | |
| 5,774,053 A | | 6/1998 | Porter | |
| 5,815,114 A | * | 9/1998 | Speasl et al. | 342/357.06 |
| 5,979,750 A | | 11/1999 | Kindell | |
| 6,204,763 B1 | | 3/2001 | Sone | |
| 6,323,782 B1 | * | 11/2001 | Stephens et al. | 340/10.31 |

FOREIGN PATENT DOCUMENTS

| | | | |
|---|---|---|---|
| JP | 64-49505 | * | 2/1989 |

* cited by examiner

*Primary Examiner*—Joseph E. Valenza
*Assistant Examiner*—Gene O. Crawford
(74) *Attorney, Agent, or Firm*—Oppedahl & Larson LLP

(57) ABSTRACT

A package storage and delivery system includes electronically controlled lockers disposed at or near customer locations. Each locker is unlocked by a courier, preferably by means of a short-range transceiver or transmitter carried on the courier's person. The customer can unlock the locker and receive the delivered package. Cryptographically signed communications are employed along with nonvolatile usage logs to minimize the risk of loss of a package or fraud by courier or customer. The lockers may be stackable, permitting a delivery courier to add lockers in the event a customer receives too many deliveries to fit into a single locker. Each box has, of course, a physical location, and has associated with it an address code indicative of the physical location, for example by means of a human-readable or compressed representation of the precise latitude and longitude. A package delivered to such a box preferably bears the address code. A merchant can greatly reduce the risk of credit card fraud by requiring the use of such codes for the simple reason that a fraudulent transaction may be traced to a specific physical location.

4 Claims, 3 Drawing Sheets

PACKAGE DELIVERY SYSTEM

CROSS REFERENCE TO RELATED APPLICATIONS

This application claims priority from and incorporates by reference the following patent applications: U.S. application Ser. No. 60/206,939 filed May 25, 2000, and International Application no. PCT/US00/28415, filed Oct. 14, 2000, designating the United States.

SUMMARY OF INVENTION

A package storage and delivery system includes electronically controlled lockers disposed at or near customer locations. Each locker is unlocked by a courier, preferably by means of a short-range transceiver or transmitter carried on the courier's person. The customer can unlock the locker and receive the delivered package. Cryptographically signed communications are employed along with nonvolatile usage logs to minimize the risk of loss of a package or fraud by courier or customer. The lockers may be stackable, permitting a delivery courier to add lockers in the event a customer receives too many deliveries to fit into a single locker. Each box has, of course, a physical location, and has associated with it an address code indicative of the physical location, for example by means of a human-readable or compressed representation of the precise latitude and longitude. A package delivered to such a box preferably bears the address code. A merchant can greatly reduce the risk of credit card fraud by requiring the use of such codes for the simple reason that a fraudulent transaction may be traced to a specific physical location.

BRIEF DESCRIPTION OF DRAWINGS

The invention will be described with respect to a drawing in several figures, of which.

Where possible, like reference designations have been used among the figures to show like elements.

DETAILED DESCRIPTION

Figure 1:
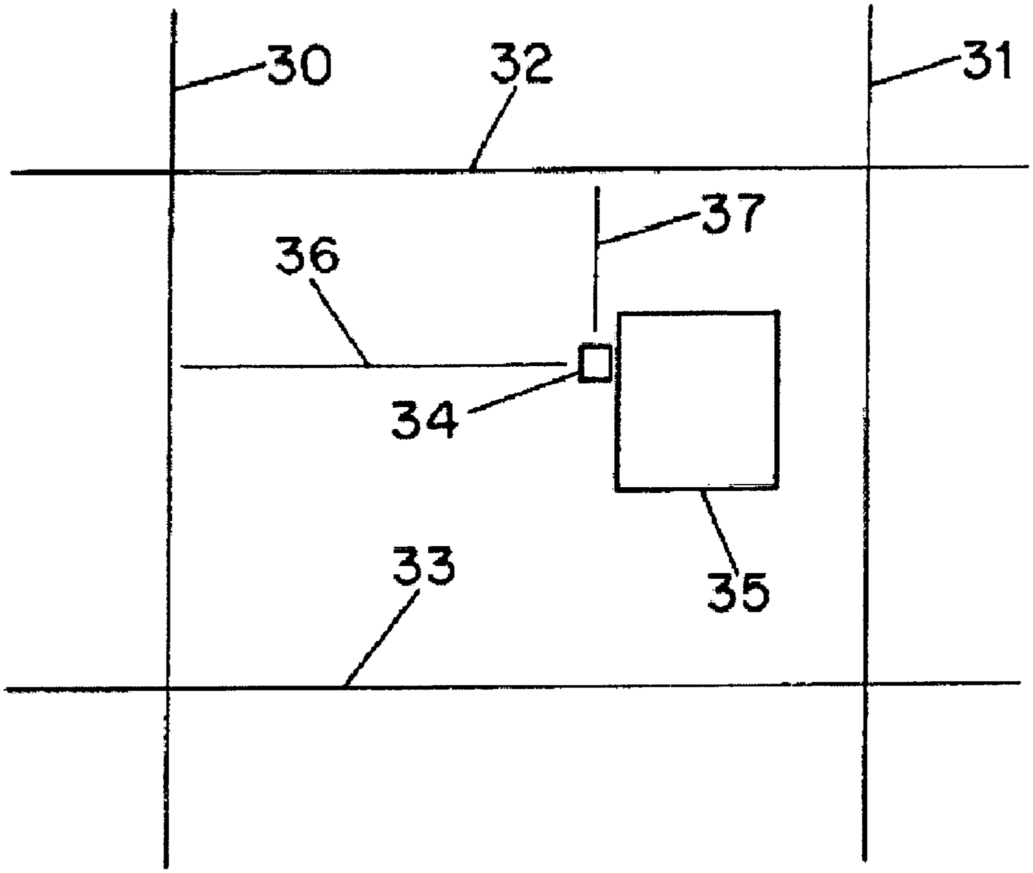
FIG. 1 is a plan view showing a locker according to the invention and a home.

Delivery of packages may be performed with respect to package lockers that are located according to a coordinate system. FIG. 1 shows a typical locker 34 attached to a home 35. The home has a location relative to lines of latitude 32, 33 and lines of longitude 30, 31 which define a grid. Lines 36, 37 define the position of the locker within the grid.

In the usual case, the location of the locker 34 is determined at the time of installation, for example using a GPS (global positioning system) receiver. The GPS receiver provides the latitude and longitude, expressed in a suitable notation such as degrees, minutes and seconds or degrees and decimal fractions of a degree. When SA (selective availability) is off, the receiver will provide a spatial resolution of typically ten or twenty feet. If SA is on, it is desirable to use DGPS (differential GPS) to provide a position of comparable accuracy.

A traditional numerical representation of a location by latitude and longitude is rather wasteful of characters. The only characters used are digits, and many of the digits are not used. Unused digits happen because, for example, the number of minutes in a degree is never more than sixty, so the first digit of a "minutes" value is never 7 or 8 or 9. Unused digits also happen because some combinations of digits correspond to geographic locations (e.g. in the Arctic or the middle of the ocean) that are unlikely to be referred to as a package delivery location is a straightforward matter to devise functions which permit expressing geographic locations with far fewer characters than decimally expressed latitudes and longitudes. Letters can be used along with all ten digits to provide locations expressed in perhaps six or eight characters depending on the desired resolution. Some economy of effort can be accomplished by selecting a reference point such as the airport which might be used to deliver a courier package for an address. Once the airport reference point is selected, it is a straightforward matter to define latitude and longitude relative to that point rather than relative to the usual global origin.

It is thus helpful to consider expressing a locker location by means of an airport code followed by some letters and numbers which communicate the precise position of the locker relative to the reference point of the airport code. Such an expression can be extremely helpful to a courier delivery service. It tells which airport to send the package to, as well as the position relative to that airport.

Figure 2:
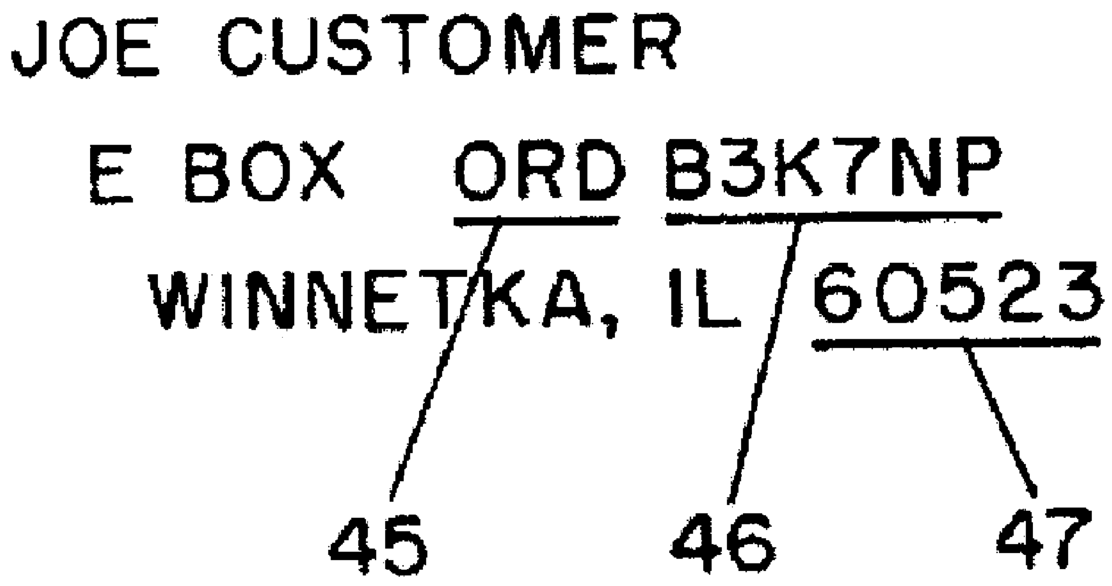
FIG. 2 shows a package addressed according to the invention.

FIG. 2 shows a package addressed according to the invention. A Zip code 47 may appear on the package but is fundamentally unrelated to the position code just described. The position code may consist of an airport code 45 as well as a character string 46 which conveys the location relative to the airport. Importantly, when a locker is installed, the installer will take a GPS reading, and with appropriate software will convert the latitude and longitude information into the character string 46.

When a would-be customer places an order for delivery of goods, the customer provides the entire "ebox" code 45, 46 to the merchant. The merchant uses the code 45, 46 to address the package.

The courier company will necessarily perform sorts on packages and will also need to load trucks efficiently. A traditional truck-loading approach is to group the packages by Zip code value. This has the advantage of being simple to do, and has the disadvantage that it may pass up opportunities for trucks to be packed optimally. Two destinations might be very near each other and yet have quite different Zip codes, for example. Sorting packages by Zip code in numerical order will not necessarily place packages near to each other that represent delivery locations that are near to each other.

The position code 45, 46 offers benefits for the trucking and delivery companies. When a truck is being packed, packages that are intended for locations that are suitably nearby to reach other can be easily identified by visual review of the position codes.

Figure 3:
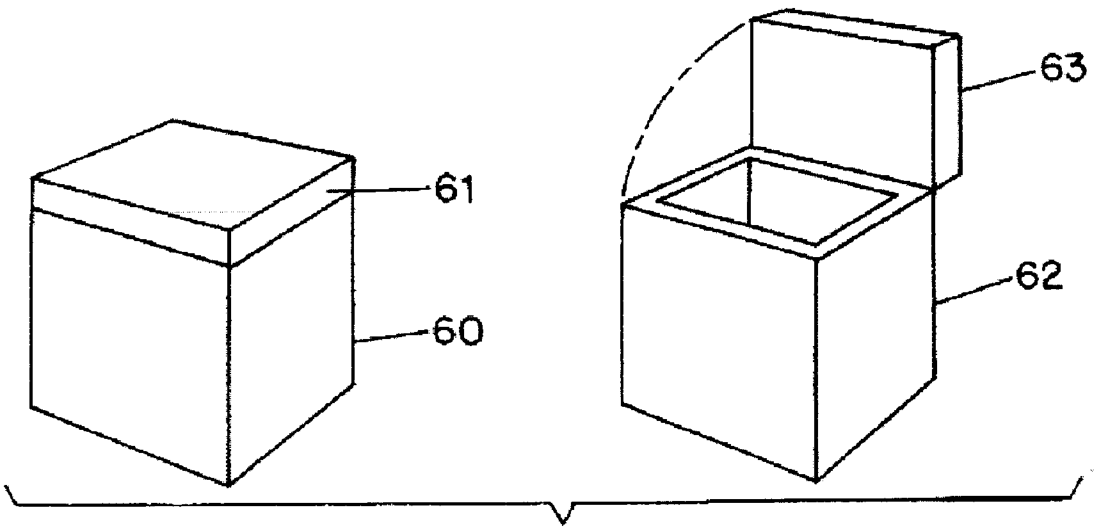
FIG. 3 shows a delivery box according to the invention.

In accordance with the invention, what happens next is that a delivery carrier takes the package to the geographic location defined by the location code, and identifies a delivery box 60 (FIG. 3). This box 60 has a lid 61 which locks and unlocks under control of a microprocessor. The carrier transmits a wireless signal to the box that prompts the box to open, and lifts the lid 61 as shown in lifted position 63. The package may then be placed in the box 62. The lid is closed, and the customer is notified that there is a package in the box.

Later, the customer causes the box to unlock, preferably by a second wireless signal, and the lid is opened. The package is removed and the lid is closed. Preferably a log is kept of the openings and closings of the box, and the log may be stored in nonvolatile memory in the box for later study in the event of some question as to the delivery of a package.

Importantly, if a merchant ships a package using a position code of the type described here, it is likely that credit card fraud losses could be reduced substantially. If a shipment turns out to have been an order placed by a fraudulent party, the position code permits the authorities to go directly to the place where the package was delivered. This pinpoint locating ability will reduce fraud by making it easier to find the fraudulent party, but also serves as preventive measure since many would-be fraudulent parties will be deterred by the increased risk of being caught.

On a very practical level a merchant that uses position-coded addresses as described above will have a lower rate of credit card fraud, and credit card merchant banks will likely offer reduced credit card commissions or other incentives to attract the business of such a merchant should also be appreciated that a storage locker such as is described above can be an important part of a delivery system that includes delivery trucks dispatched to deliver during off-peak times. In many areas a suitable off-peak time will be late at night, for example between 10 PM and 7 AM. A typical delivery driver and truck operating during off-peak hours and using lockers such as are described above will be able to perform many more deliveries per hour than a driver and truck operating during peak times (such as during daylight hours) and without such lockers.

In an off-peak approach, the packages may be addressed with location codes as described above. Alternatively, the addresses may be traditional postal service addresses. In either case, some means is required for securely unlocking and locking the lockers. One approach is to receive an order from a customer and to establish a unique identifier in connection with the order. When the carrier reaches the locker, a message is communicated to the locker, preferably by wireless means such as radio or infrared. The locker tests for a predetermined relationship between the message and the identifier, and if the relationship is satisfied the locker unlocks and the lid can be opened. The package is placed in the locker and the lid is closed and locked. The user is then notified that there is a package in the locker.

Those skilled in the art will have no difficulty devising myriad obvious improvements and enhancements to the invention described, all of which are to be considered with the scope of the invention as defined by the claims which follow.

What is claimed is:

1. A method of delivering a package from a sender to a destination comprising the steps of:

determining a physical location of the destination within a coordinate system to within a predetermined accuracy;

representing the physical location of the destination by means of an address code indicative of the physical location;

communicating to a sender a request requesting delivery of a package by a sender and communicating the address code to the sender in the request;

addressing the package with information indicative of the address code;

reading the information and deriving the address code therefrom;

proceeding to the actual location defined by the address code;

electronically performing a first unlocking of a locker at the actual location;

locking the locker after the electronic unlocking;

performing a second unlocking of the locker;

removing the package from the locker; and logging the first and second unlocking.

2. The method of claim 1 wherein the coordinate system is latitude and longitude and the predetermined accuracy is that obtainable through a satellite global positioning system.

3. A method of installing a locker at a destination of a customer comprising the steps of:

determining a physical location of the destination within a coordinate system to within a predetermined accuracy;

representing the physical location of the destination by means of an address code indicative of the physical location;

communicating the address code to the customer.

4. The method of claim 3 wherein the coordinate system is latitude and longitude and the predetermined accuracy is that obtainable through a satellite global positioning system.

* * * * *